United States Patent
Qu

(10) Patent No.: US 9,781,579 B2
(45) Date of Patent: Oct. 3, 2017

(54) METHOD AND DEVICE FOR REALIZING TERMINAL WIFI TALKBACK

(71) Applicant: ZTE CORPORATION, Guangdong (CN)

(72) Inventor: Guotao Qu, Shenzhen (CN)

(73) Assignee: XI'AN ZHONGXING NEW SOFTWARE CO. LTD., Xi'An, Shaanxi (CN)

( * ) Notice: Subject to any disclaimer, the term of this patent is extended or adjusted under 35 U.S.C. 154(b) by 0 days.

(21) Appl. No.: 15/029,633

(22) PCT Filed: Apr. 18, 2014

(86) PCT No.: PCT/CN2014/075676
§ 371 (c)(1),
(2) Date: Apr. 15, 2016

(87) PCT Pub. No.: WO2014/169844
PCT Pub. Date: Oct. 23, 2014

(65) Prior Publication Data
US 2016/0261994 A1    Sep. 8, 2016

(30) Foreign Application Priority Data
Oct. 17, 2013  (CN) .......................... 2013 1 0486374

(51) Int. Cl.
*H04W 4/06*    (2009.01)
*H04W 4/10*    (2009.01)
(Continued)

(52) U.S. Cl.
CPC ........... *H04W 4/10* (2013.01); *H04L 61/2015* (2013.01); *H04L 65/1069* (2013.01); *H04W 4/16* (2013.01);
(Continued)

(58) Field of Classification Search
CPC .............................. H04W 4/06; H04L 61/2007
(Continued)

(56) References Cited

U.S. PATENT DOCUMENTS 8,417,186 B2 * 4/2013 Preston ............... H04M 1/6066
455/41.2
9,282,439 B1 * 3/2016 Qu ........................ H04W 4/08
(Continued)

FOREIGN PATENT DOCUMENTS

CN         1780176 A        5/2006
CN       101557566 A       10/2009
(Continued)

*Primary Examiner* — John J Lee
(74) *Attorney, Agent, or Firm* — Ling Wu; Stephen Yang; Ling and Yang Intellectual Property

(57) ABSTRACT

Disclosed are a method and device for realizing WIFI talkback of a terminal, related to the field of mobile communications technologies, wherein the method includes the following steps: a calling terminal initiating a request for obtaining a dynamic IP address via a WIFI wireless local area network (LAN); after receiving the request, a called terminal judging whether the calling terminal has successfully obtained the dynamic IP address; if the called terminal determines that the calling terminal has successfully obtained the dynamic IP address, it determining whether the calling terminal has enabled a talkback function; if the called terminal determines that the calling terminal has initiated the talkback function, the called terminal sending a message to the calling terminal for indicating that the called terminal is online, thereby enabling the calling terminal and the called terminal to perform the WIFI talkback.

20 Claims, 4 Drawing Sheets

(51) Int. Cl.
*H04W 4/16* (2009.01)
*H04W 76/00* (2009.01)
*H04W 76/02* (2009.01)
*H04L 29/12* (2006.01)
*H04L 29/06* (2006.01)
*H04L 29/08* (2006.01)
*H04W 84/12* (2009.01)

(52) U.S. Cl.
CPC ......... *H04W 76/005* (2013.01); *H04W 76/02* (2013.01); *H04L 67/24* (2013.01); *H04W 84/12* (2013.01)

(58) Field of Classification Search
USPC ............. 455/519, 520, 517, 466, 452.1, 509
See application file for complete search history.

(56) References Cited

U.S. PATENT DOCUMENTS

| | | | |
|---|---|---|---|
| 2003/0053434 A1 | 3/2003 | Chow et al. | |
| 2006/0161770 A1 | 7/2006 | Goto et al. | |
| 2011/0195705 A1* | 8/2011 | Gobien | H01Q 5/50 455/423 |

FOREIGN PATENT DOCUMENTS

| | | |
|---|---|---|
| CN | 102340764 A | 2/2012 |
| WO | 2013005077 A1 | 1/2013 |

* cited by examiner

METHOD AND DEVICE FOR REALIZING TERMINAL WIFI TALKBACK

TECHNICAL FIELD

The present document relates to the field of mobile communication technologies, and more particularly, to a method and device for realizing WIFI talkback of a terminal.

BACKGROUND OF THE RELATED ART

Now, with the popularity of smart phones, functions of more and more terminal equipments including mobile phones and tablet PCs and so on are very powerful, and there are a lot of applications of the mobile phone walkie-talkie. However, most of them are sending voice data to each other via a public network.

SUMMARY OF THE INVENTION

The present document provides a method and device for achieving WIFI talkback of a terminal by sending voice data to other parties through a wireless local area network (LAN).

The object of the present document is to provide a method and device for realizing WIFI talkback of a terminal to solve the problem of sending voice data to the other party without using data traffic in the related art.

According to one aspect of the present document, there is provided a method for realizing WIFI talkback of a terminal, comprising the following steps:

initiating, by a calling terminal, a request for obtaining a dynamic IP address via a WIFI wireless local area network;

after receiving the request, judging, by a called terminal, whether the calling terminal has successfully obtained the dynamic IP address or not;

if the called terminal judges that the calling terminal has successfully obtained the dynamic IP address, judging, by the called terminal, whether the calling terminal enables a talkback function or not;

if the called terminal judges that the calling terminal has enabled the talkback function, sending, by the called terminal, a message to the calling terminal for indicating that the called terminal is online, thereby enabling the calling terminal and the called terminal to perform the WIFI talkback.

Preferably, the step of initiating, by the calling terminal, a request for obtaining a dynamic IP address via a WIFI wireless local area network comprises:

sending, by the calling terminal, a release message via the WIFI wireless local area network (LAN) to release a static IP address assigned by the WIFI;

by releasing the static IP address assigned by the WIFI, initiating a request again for obtaining a dynamic IP address via the WIFI wireless LAN.

Preferably, the step of judging, by the called terminal, whether the calling terminal successfully obtains the dynamic IP address or not after receiving the request comprises:

after receiving the request, monitoring, by the called terminal, whether an acknowledgment (ACK) message sent by a Dynamic Host Configuration Protocol (DHCP) server is received or not;

if the ACK message sent by the DHCP server is received, determining that the calling terminal successfully obtains the dynamic IP address;

if the ACK message sent by the DHCP server is not received, determining that the calling terminal fails to obtain the dynamic IP address.

Preferably, the step of judging whether the calling terminal has enabled the talkback function or not if the called terminal determines that the calling terminal has successfully obtained the dynamic IP address comprises:

when the called terminal determines that the calling terminal has successfully obtained the dynamic IP address, judging whether the calling terminal has enabled the talkback function or not by a host name in the received request initiated by the calling terminal for obtaining the dynamic IP address;

if the host name is a default host name in the DHCP server, determining that the calling terminal has not enabled the talkback function;

if the host name is a modified host name in the DHCP server, determining that the calling terminal has already enabled the talkback function.

Preferably, the step of sending a message to the calling terminal for indicating that the called terminal is already online and enabling the calling terminal and the called terminal to perform the WIFI talkback if the called terminal determines that the calling terminal has already enabled the talkback function comprises:

when the called terminal determines that the calling terminal has enabled the talkback function, notifying, by the called terminal, the calling terminal that it is already online by sending a request message, so as to enable the calling terminal and the called terminal to perform the WIFI talkback.

According to another aspect of the present document, there is provided a device for realizing WIFI talkback of a terminal, comprising:

a requesting module, configured to: initiate, by a calling terminal, a request for obtaining a dynamic IP address via a WIFI wireless local area network;

a judging module, configured to: after a called terminal receives the request, judge whether the calling terminal has successfully obtained the dynamic IP address or not, and judge whether the calling terminal has enabled the talkback function or not if the called terminal determines that the calling terminal has successfully obtained the dynamic IP address;

a WIFI talkback module, configured to: if the called terminal determines that the calling terminal has enabled the talkback function, send a message to the calling terminal for indicating that the called terminal is already online, thereby enabling the calling terminal and the called terminal to perform the WIFI talkback.

Preferably, the requesting module comprises:

a static IP address releasing unit, configured to: send, by the calling terminal, a release message via the WIFI wireless LAN to release the static IP address assigned by the WIFI;

a dynamic IP address obtaining unit, configured to: initiate a request again for obtaining a dynamic IP address via the WIFI wireless LAN by releasing the static IP address assigned by the WIFI.

Preferably, the judging unit comprises:

an ACK judging and receiving unit, configured to: after the called terminal receives the request, monitor whether an acknowledgment (ACK) message sent by a Dynamic Host Configuration Protocol (DHCP) server is received or not;

a processing unit, configured to: when the ACK message sent by the DHCP server is received, determine that the calling terminal successfully obtains the dynamic IP address; and when the ACK message sent by the DHCP server is not received, determine that the calling terminal fails to obtain the dynamic IP address.

Preferably, the judging unit further comprises:

a host name judging unit, configured to: when the called terminal determines that the calling terminal has successfully obtained the dynamic IP address, judge whether the calling terminal has enabled the talkback function or not through a host name in the received request initiated by the calling terminal for obtaining the dynamic IP address;

a processing unit, configured to: when the host name is a default host name in the DHCP server, determine that the calling terminal has not enabled the talkback function; and when the host name is a modified host name in the DHCP server, determine that the calling terminal has already enabled the talkback function.

Preferably, the WIFI talkback module is configured to: when the called terminal determines that the calling terminal has enabled the talkback function, notify, by the called terminal, the calling terminal that it is online by sending a request message, thereby enabling the calling terminal and the called terminal to perform the WIFI talkback.

Compared with the related art, the beneficial effects according to the embodiment of the present document are that:

the embodiment of the present document can realize the talkback function within the range of a building without connected to a public network, which adds functions to a mobile phone.

PREFERRED EMBODIMENTS

Hereinafter, in conjunction with the accompanying drawings, the preferred embodiments of the present document will be described in detail. It should be understood that, the preferred embodiments described below are illustrative only and are used to explain the present document and are not intended to limit the present document.

Figure 1:
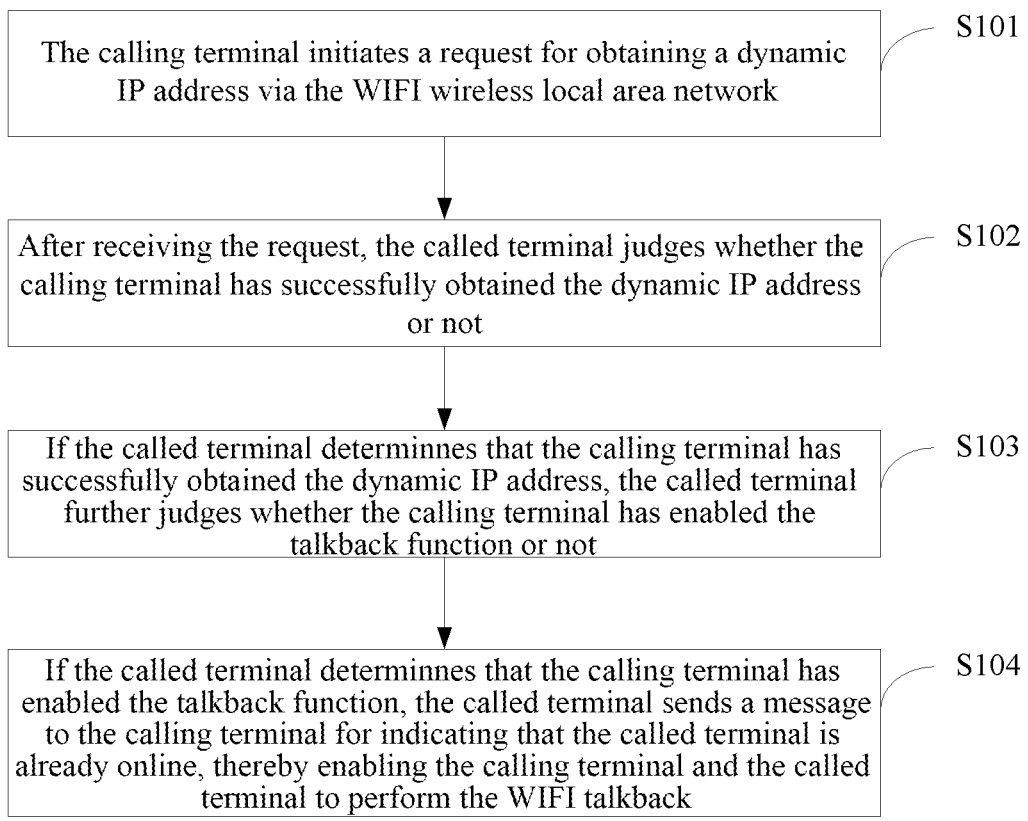
FIG. 1 is a flow chart of a method for realizing WIFI talkback of a terminal provided in an embodiment of the present document.

FIG. 1 shows a flow chart of a method for realizing WIFI talkback of a terminal provided in the present document, as shown in FIG. 1, and the method includes the following steps:

in step S101: the calling terminal initiates a request for obtaining a dynamic IP address via the WIFI wireless local area network;

in step S102: after receiving the request, the called terminal judges whether the calling terminal has successfully obtained the dynamic IP address or not;

in step S103: if the called terminal determines that the calling terminal has successfully obtained the dynamic IP address, the called terminal further judges whether the calling terminal has enabled the talkback function or not;

in step S104: if the called terminal judges that the calling terminal has enabled the talkback function, the called terminal sends a message to the calling terminal for indicating that the called terminal is already online, thereby enabling the calling terminal and the called terminal to perform the WIFI talkback.

The step of the calling terminal initiating a request for obtaining a dynamic IP address via the WIFI wireless LAN includes: the calling terminal sending a release message via the WIFI wireless LAN to release the static IP address assigned by the WIFI; and initiating a request again for obtaining a dynamic IP address via the WIFI wireless LAN by releasing the static IP address assigned by the WIFI.

The step of the called terminal judging whether the calling terminal has successfully obtained the dynamic IP address or not after receiving the request includes: after receiving the request, the called terminal monitoring whether an ACK message sent by the dynamic host configuration protocol (DHCP) server is received or not; if the ACK message sent by the DHCP server is received, determining that the calling terminal has successfully obtained the dynamic IP address; if the ACK message sent by the DHCP server is not received, determining that the calling terminal fails to obtain the dynamic IP address.

The step of the called terminal further judging whether the calling terminal has enabled the talkback function or not when the called terminal judges that the calling terminal has successfully obtained the dynamic IP address includes: when the called terminal determines that the calling terminal has successfully obtained the dynamic IP address, judging whether the calling terminal has enabled the talkback function or not through the host name in the received request initiated by the calling terminal for obtaining the dynamic IP address; if the host name is a default host name in the DHCP server, determining that the calling terminal has not enabled the talkback function; if the host name is a modified host name in the DHCP server, determining that the calling terminal has enabled the talkback function.

The step of the called terminal sending a message to the calling terminal for indicating that the called terminal is already online if the called terminal judges that the calling terminal has enabled the talkback function, so that the calling terminal and the called terminal can perform the WIFI talkback includes: when the called terminal determines that the calling terminal has enabled the talkback function, the called terminal notifying the calling terminal that it is online by sending a request message, thereby enabling the calling terminal and the called terminal to execute the WIFI talkback.

Figure 2:
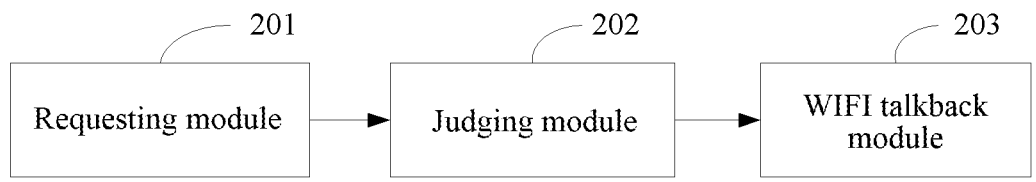
FIG. 2 is a schematic diagram of a device for realizing WIFI talkback of a terminal provided in an embodiment of the present document.

FIG. 2 shows a schematic diagram of a device for realizing WIFI talkback of a terminal provided in the present document, as shown in FIG. 2, it includes: a requesting module 201, used to: initiate, by a calling terminal, a request for obtaining a dynamic IP address via a WIFI wireless local area network; a judging module 202, used to: after a called terminal receives the request, judge whether the calling terminal has successfully obtained the dynamic IP address or not, and further judge whether the calling terminal has enabled the talkback function or not if the called terminal determines that the calling terminal has successfully obtained the dynamic IP address; a WIFI talkback module 203, used to: if the called terminal judges that the calling terminal has enabled the talkback function, send a message to the calling terminal for indicating that the called terminal is already online, thereby enabling the calling terminal and the called terminal to execute the WIFI talkback.

Specifically, the requesting module 201 includes: a static IP address releasing unit, used to: send, by the calling terminal, a release message via the WIFI wireless LAN to release the static IP address assigned by the WIFI; a dynamic IP address obtaining unit, used to: initiate a request again for obtaining the dynamic IP address via the WIFI wireless LAN by releasing the static IP address assigned by the WIFI.

The judging unit 202 includes: an ACK judging and receiving unit, used to: after the called terminal receives the request, monitor whether an ACK message sent by the Dynamic Host Configuration Protocol (DHCP) server is received or not; a processing unit, used to: when the ACK message sent by the DHCP server is received, determine that the calling terminal has successfully obtained the dynamic IP address; and when the ACK message sent by the DHCP server is not received, determine that the calling terminal fails to obtain the dynamic IP address.

The judging unit 202 further includes: a host name judging unit, used to: when the called terminal determines that the calling terminal has successfully obtained the dynamic IP address, judge whether the calling terminal has enabled the talkback function or not through the host name in the received request initiated by the calling terminal for obtaining the dynamic IP address; a processing unit, used to: when the host name is the default host name in the DHCP server, determine that the calling terminal has not enabled the talkback function; and when the host name is a modified host name in the DHCP server, judge that the calling terminal has already enabled the talkback function.

The WIFI talkback module 203 is used to: when the called terminal determines that the calling terminal has enabled the talkback function, notify, by the called terminal, the calling terminal that it is online by sending a request message, thereby enabling the calling terminal and the called terminal to perform the WIFI talkback.

That is, the present document includes the following parts: 1, the wireless network part; what this part implements are the network coverage function of the LAN. 2, the terminal part; this part is the hardware carrier of the walkie-talkie of the LAN. 3, the walkie-talkie application software; what this software implements are functions such as searching for a user target, inputting voice data and transferring voice data.

The wireless network part: this part makes use of the relay function of the router and the WIFI roaming function to build a local area network environment, and the step of building the LAN includes: first, networking in the range of a building, according to the effective wireless range of the router, reasonably placing access points (APs) and configuring the routing relay function according to the networking situation of AP. Subsequently, all the parameters of AP are set as conditions for the WIFI roaming. Through the networking, the terminal can move freely within the network and the network would not be disconnected, as shown in FIG. 3.

The terminal part: this part is mainly terminal hardware, including but not limited to: smart phones and smart tablets.

Walkie-talkie application software: what this software implements are the walkie-talkie function of the LAN. The biggest difference from the walkie-talkie software feature in the existing network is dynamically updating the user state information by monitoring to the DHCP server, while the existing network walkie-talkie stores the state information of the walkie-talkie through the server, as shown in FIG. 4.

Figure 3:
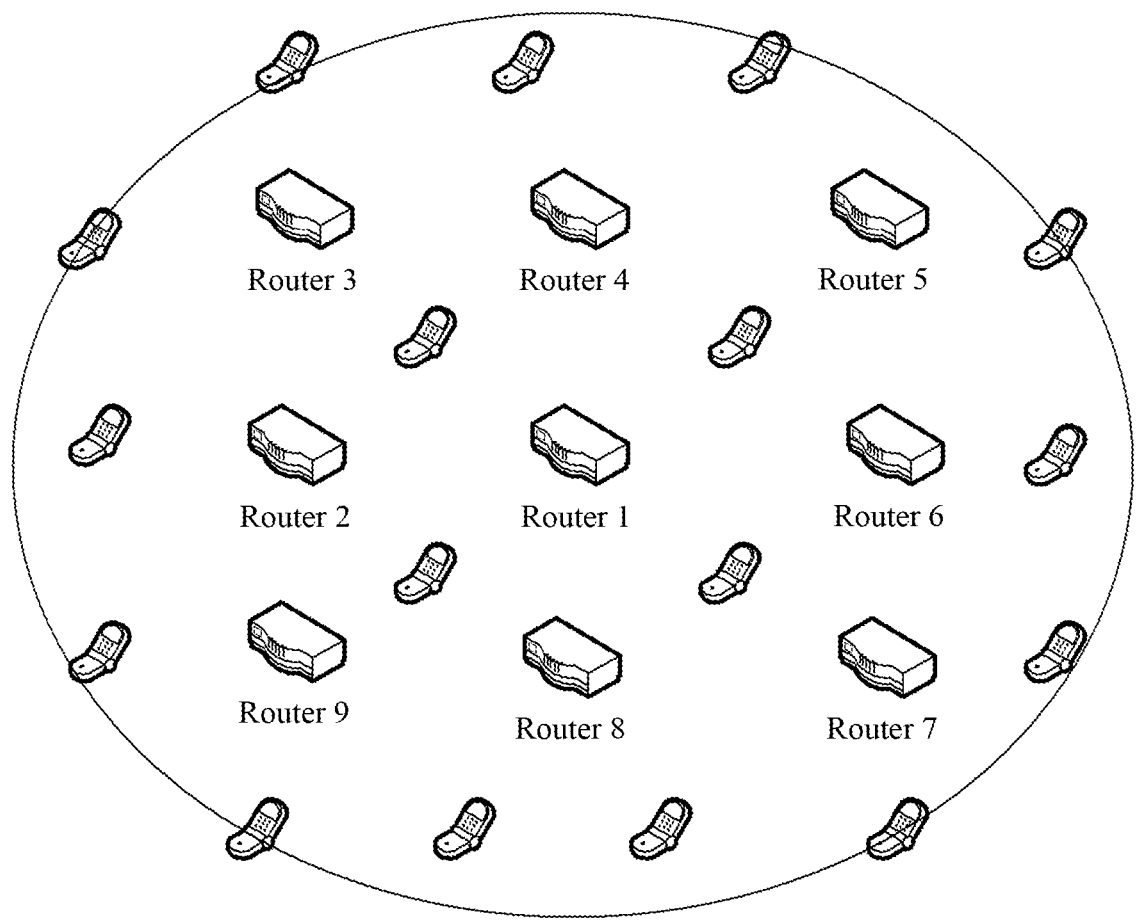
FIG. 3 is a network block diagram of a wireless local area network provided in an embodiment of the present document.

FIG. 3 shows a network block diagram of a wireless local area network provided in an embodiment of the present document, as shown in FIG. 3, a plurality of wireless routers is used for networking, and the relay function of the wireless router is configured according to different situations, meanwhile, parameters of the wireless router are set for the WIFI to roam.

Figure 4:
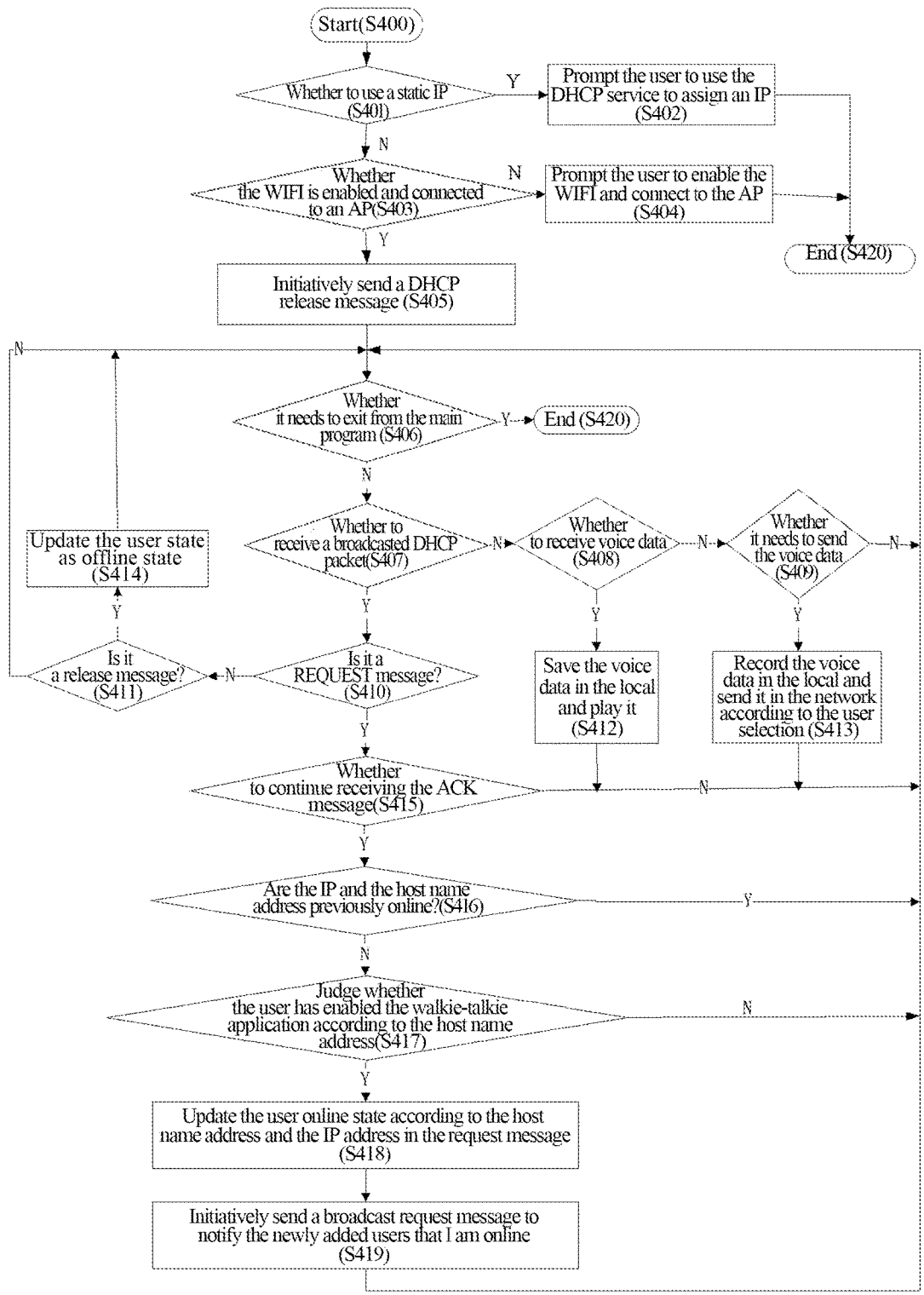
FIG. 4 is a software flow chart of application software provided in an embodiment of the present document.

FIG. 4 shows a software flow chart of the application software provided in the embodiment of the present document, as shown in FIG. 4, it includes the following steps:

in step S400, it is to enable the application program;

in step S401, it is to judge whether the phone uses a static IP address or not;

if yes, the process proceeds to step S402, otherwise, it proceeds to step S403.

In step S402, it is to prompt the user to use the DHCP service to assign an IP address; and end.

In step S403, it is to judge whether the phone has enabled the WIFI and connected to an AP (Access Point) or not;

if yes, the process proceeds to step S405, otherwise, it proceeds to step S404.

In step S404, it is to prompt the user to enable the WIFI and connect to the AP; and end.

In step S405, it is to release the obtained IP and send a DHCP RELEASE message;

The purpose is to initiate a REQUEST message again so that other users within the network can monitor that there are users entering into the network through this broadcast. Sending one DHCP RELEASE message is because that the WIFI is connected and an IP is assigned when the application has not been enabled, but then the host name carried in the DHCP REQUEST packet is the default "Android+ random number", so other users in the network will not determine that there are someone online, then a RELEASE is sent to re-obtain the IP, then the host name will use "ZTE+user-defined group+user-defined host name", and other users in the network can determine that someone are online based on these.

In step S406, it is to judge whether a user initiatively requests to leave the program or not;

if yes, the process proceeds to step S420, otherwise, it proceeds to step S407.

In step S407, it is to judge whether a broadcasted DHCP message is received or not;

if the message is received, it needs to carry out further analysis and proceed to step S410 according to the type of message, otherwise, it proceeds to step S408.

In step S408, it is to judge whether the voice data of the network are received or not;

If the voice data are received, it needs to store and play the data, the process proceeds to step S412, otherwise, it proceeds to step S409.

In step S409, it is to judge whether it needs to send the voice information or not;

If the user needs to send the voice information, the user switches on the recorder function to record and save the user voice, and perform the transmission according to the transmitting object selected by the user, then the process proceeds to step S413, otherwise it proceeds to step S406.

In step S410, it is to judge whether the received DHCP packet is a REQUEST message or not;

if yes, it proves that the user is requesting for an IP or renewing an IP address, and the process proceeds to step S415, and it further judges whether an IP is obtained successfully or not, if no, it proceeds to step S411.

In step S411, it is to judge whether the received DHCP packet is a RELEASE message or not;

if it proves that there is a user initiatively being offline, the process proceeds to step S414 to update the user state, otherwise, it proceeds to step S406.

In step S412, it is to store locally and play the received voice data;

in step S413, it is to enable the recording function, record and encode the user voice, and perform the transmission according to the transmitting object selected by the user;

in step S414, it is to update the user state to offline state;

in step S415, it is to continue monitoring whether a DHCP server sends an ACK message or not;

If yes, it proves that the requested IP address in the REQUEST message is successful, the process proceeds to step S416, or the ACK message is not received or other messages are received, it proves that the IP address is not obtained correctly, then the process proceeds to step S406.

In step S416, it is to compare the IP address and the host name in the previously received REQUEST packet with all online users in an existing phone;

If both the IP address and the host name are the same, it proves that the user is not a new user, the process proceeds to step S406, otherwise it proceeds to step S417.

In step S417, it is to judge whether the user has enabled the walkie-talkie function or not according to the host name in the previously received REQUEST packet;

as for the android system, the DHCP server uses "Android+random number" as the host name by default, and if the application program is enabled, the host name in the DHCP protocol is modified as: "ZTE+User Defined Group+user-defined host name". If the application program is not enabled, the default host name in the system will be used. Based on this, it can judge whether the walkie-talkie function is enabled or not according to whether the name includes the character of "ZTE" or not. Of course, the character of "ZTE" can also be changed. If the user has enabled the walkie-talkie function, the process proceeds to step S418, otherwise it proceeds to step S406.

The "User-defined group" and "user-defined host name" can be based on the input by the user in the interface, and the input data is saved in the database and read from the database and filled when it is used. Meanwhile, besides of "ZTE", the field can also be expanded as needed.

In step S418, it is to update the user state according to the IP address and the host name in the previously received REQUEST packet;

In step S419, it is to initiatively send a REQUEST message to notify the newly added users that I am online;

the newly added users can achieve the function of the user state update in the network.

In step S420, it is to end the application program.

Initiatively sending the RELEASE message after the application program ends is to notify other online users that the local machine is offline. When requesting for an IP address again thereafter, the host name carried in the REQUEST packet has used the default "Android+random number" in the system, and the judgment of the user state will not be affected when the users in the network instantly receive such a message.

Furthermore, herein the corresponding fields of the IP and the host name in the DHCP protocol are respectively: Requested IP Address and Host Name Address.

In addition, the walkie-talkie function is made into an application placed in the phone. For example: it can be made as a single APK in the android system to achieve the walkie-talkie function.

Figure 5:
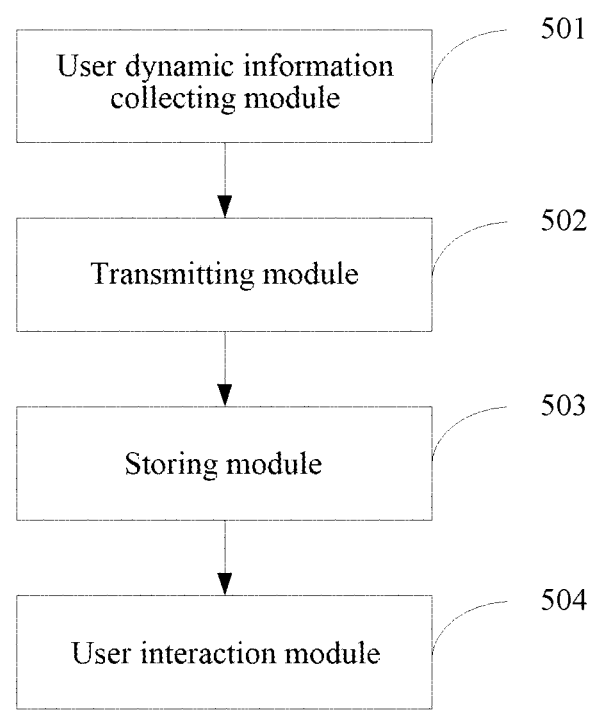
FIG. 5 is a schematic diagram of software modules in the application software provided in the embodiment of the present document.

FIG. 5 shows a schematic diagram of software modules of an application software provided in an embodiment of the present document, as shown in FIG. 5, it includes: a user dynamic information collecting module 501: which mainly judges the online/offline condition of a user according to the DHCP protocol; a transmitting module 502: this module is responsible for receiving voice data over the network, and sending data to the network, and sending the received data to a storing module; the storing module 503: this module is responsible for storing voices received from the transmitting module and voice information that would be sent to the network and the related user ID, IP address and other information; it is further responsible for storing the local user ID and group information; a user interaction module 504: this module is responsible for displaying the user interaction, including receiving and displaying the user state and other information of the user dynamic information module; reading and playing the voice stored in the storing module; recording the user voice, and sending the recorded voice, the destination address IP and the user ID to the storing module to store and to the transmitting module to transmit; and they are provided to the user in the form of an input box so that the user can modify the user ID and the group information and other information.

Preferably, the user interaction module 504 may have a broadcast button, a group button and a button for each online user, and the user can press these buttons to broadcast voice to all members, voice to a group of users only, or voice to a user only.

The embodiment of the present document can transmit not only voice data, but also other data such as texts and images.

Although the present document has been described in detail in the above, the present document is not limited to this, those skilled in the art can make various modifications in accordance with the principles of the present document. Therefore, any modifications made in accordance with the principles of the present document should be understood to fall within the protection scope of the present document.

INDUSTRIAL APPLICABILITY

In summary, the embodiments of the invention have the following technical effects:

the embodiments of the present document use the relay function of a wireless router and the WIFI roaming function to achieve the function of voice data traffic transmission without using data traffic, and by monitoring DHCP (Dynamic Host Configuration Protocol) packets through a terminal, it achieves the function of dynamic update management of user state and improves the user experience without a server.

What is claimed is:

1. A method for realizing WIFI talkback of a terminal, comprising the following steps:

initiating, by a calling terminal, a request for obtaining a dynamic internet protocol (IP) address via a WIFI wireless local area network;

after receiving the request, judging, by a called terminal, whether the calling terminal has successfully obtained the dynamic IP address or not;

if the called terminal determines that the calling terminal has successfully obtained the dynamic IP address, judging, by the called terminal, whether the calling terminal enables a talkback function or not;

if the called terminal determines that the calling terminal has enabled the talkback function, sending, by the called terminal, a message to the calling terminal for indicating that the called terminal is already online, thereby enabling the calling terminal and the called terminal to perform the WIFI talkback.

2. The method of claim 1, wherein the step of initiating, by the calling terminal, a request for obtaining a dynamic IP address via a WIFI wireless local area network comprises:
    sending, by the calling terminal, a release message via the WIFI wireless local area network (LAN) to release a static IP address assigned by WIFI;
    by releasing the static IP address assigned by the WIFI, initiating a request again for obtaining a dynamic IP address via the WIFI wireless LAN.

3. The method of claim 2, wherein the step of judging, by the called terminal, whether the calling terminal successfully obtains the dynamic IP address or not after receiving the request comprises:
    after receiving the request, monitoring, by the called terminal, whether an acknowledgment (ACK) message sent by a Dynamic Host Configuration Protocol (DHCP) server is received or not;
    if the ACK message sent by the DHCP server is received, determining that the calling terminal successfully obtains the dynamic IP address;
    if the ACK message sent by the DHCP server is not received, determining that the calling terminal fails to obtain the dynamic IP address.

4. The method of claim 2, wherein the step of judging whether the calling terminal has enabled the talkback function or not if the called terminal determines that the calling terminal has successfully obtained the dynamic IP address comprises:
    when the called terminal determines that the calling terminal has successfully obtained the dynamic IP address, judging whether the calling terminal has enabled the talkback function or not by a host name in the received request initiated by the calling terminal for obtaining the dynamic IP address;
    if the host name is a default host name in a DHCP server, determining that the calling terminal has not enabled the talkback function;
    if the host name is a modified host name in the DHCP server, determining that the calling terminal has already enabled the talkback function.

5. The method of claim 2, wherein the step of sending a message to the calling terminal for indicating that the called terminal is already online and enabling the calling terminal and the called terminal to perform the WIFI talkback if the called terminal determines that the calling terminal has already enabled the talkback function comprises:
    when the called terminal determines that the calling terminal has enabled the talkback function, notifying, by the called terminal, the calling terminal that the called terminal is already online by sending a request message, so as to enable the calling terminal and the called terminal to perform the WIFI talkback.

6. The method of claim 1, wherein the step of judging, by the called terminal, whether the calling terminal successfully obtains the dynamic IP address or not after receiving the request comprises:
    after receiving the request, monitoring, by the called terminal, whether an acknowledgment (ACK) message sent by a Dynamic Host Configuration Protocol (DHCP) server is received or not;
    if the ACK message sent by the DHCP server is received, determining that the calling terminal successfully obtains the dynamic IP address;
    if the ACK message sent by the DHCP server is not received, determining that the calling terminal fails to obtain the dynamic IP address.

7. The method of claim 6, wherein the step of judging whether the calling terminal has enabled the talkback function or not if the called terminal determines that the calling terminal has successfully obtained the dynamic IP address comprises:
    when the called terminal determines that the calling terminal has successfully obtained the dynamic IP address, judging whether the calling terminal has enabled the talkback function or not by a host name in the received request initiated by the calling terminal for obtaining the dynamic IP address;
    if the host name is a default host name in a DHCP server, determining that the calling terminal has not enabled the talkback function;
    if the host name is a modified host name in the DHCP server, determining that the calling terminal has already enabled the talkback function.

8. The method of claim 6, wherein the step of sending a message to the calling terminal for indicating that the called terminal is already online and enabling the calling terminal and the called terminal to perform the WIFI talkback if the called terminal determines that the calling terminal has already enabled the talkback function comprises:
    when the called terminal determines that the calling terminal has enabled the talkback function, notifying, by the called terminal, the calling terminal that the called terminal is already online by sending a request message, so as to enable the calling terminal and the called terminal to perform the WIFI talkback.

9. The method of claim 1, wherein the step of judging whether the calling terminal has enabled the talkback function or not if the called terminal determines that the calling terminal has successfully obtained the dynamic IP address comprises:
    when the called terminal determines that the calling terminal has successfully obtained the dynamic IP address, judging whether the calling terminal has enabled the talkback function or not by a host name in the received request initiated by the calling terminal for obtaining the dynamic IP address;
    if the host name is a default host name in a DHCP server, determining that the calling terminal has not enabled the talkback function;
    if the host name is a modified host name in the DHCP server, determining that the calling terminal has already enabled the talkback function.

10. The method of claim 9, wherein the step of sending a message to the calling terminal for indicating that the called terminal is already online and enabling the calling terminal and the called terminal to perform the WIFI talkback if the called terminal determines that the calling terminal has already enabled the talkback function comprises:
    when the called terminal determines that the calling terminal has enabled the talkback function, notifying, by the called terminal, the calling terminal that the called terminal is already online by sending a request message, so as to enable the calling terminal and the called terminal to perform the WIFI talkback.

11. The method of claim 1, wherein the step of sending a message to the calling terminal for indicating that the called terminal is already online and enabling the calling terminal and the called terminal to perform the WIFI talkback if the called terminal determines that the calling terminal has already enabled the talkback function comprises:
    when the called terminal determines that the calling terminal has enabled the talkback function, notifying, by the called terminal, the calling terminal that the called terminal is already online by sending a request message, so as to enable the calling terminal and the called terminal to perform the WIFI talkback.

12. A device for realizing WIFI talkback of a terminal, comprising:
- a requesting module, configured to: initiate, by a calling terminal, a request for obtaining a dynamic IP address via a WIFI wireless local area network;
- a judging module, configured to: after a called terminal receives the request, judge whether the calling terminal has successfully obtained the dynamic IP address or not, and judge whether the calling terminal has enabled a talkback function or not if the called terminal determines that the calling terminal has successfully obtained the dynamic IP address;
- a WIFI talkback module, configured to: if the called terminal determines that the calling terminal has enabled the talkback function, send a message to the calling terminal for indicating that the called terminal is already online, thereby enabling the calling terminal and the called terminal to perform the WIFI talkback.

13. The device of claim 12, wherein the requesting module comprises:
- a static IP address releasing unit, configured to: send, by the calling terminal, a release message via the WIFI wireless LAN to release a static IP address assigned by WIFI;
- a dynamic IP address obtaining unit, configured to: initiate a request again for obtaining a dynamic IP address via the WIFI wireless LAN by releasing the static IP address assigned by the WIFI.

14. The device of claim 13, wherein the judging unit comprises:
- an ACK judging and receiving unit, configured to: after the called terminal receives the request, monitor whether an acknowledgment (ACK) message sent by a Dynamic Host Configuration Protocol (DHCP) server is received or not;
- a processing unit, configured to: when the ACK message sent by the DHCP server is received, determine that the calling terminal successfully obtains the dynamic IP address; and
- when the ACK message sent by the DHCP server is not received, determine that the calling terminal fails to obtain the dynamic IP address.

15. The device of claim 13, wherein the judging unit further comprises:
- a host name judging unit, configured to: when the called terminal determines that the calling terminal has successfully obtained the dynamic IP address, judge whether the calling terminal has enabled the talkback function or not through a host name in the received request initiated by the calling terminal for obtaining the dynamic IP address;
- a processing unit, configured to: when the host name is a default host name in a DHCP server, determine that the calling terminal has not enabled the talkback function; and when the host name is a modified host name in the DHCP server, determine that the calling terminal has already enabled the talkback function.

16. The device of claim 13, wherein the WIFI talkback module is configured to: when the called terminal determines that the calling terminal has enabled the talkback function, notify, by the called terminal, the calling terminal that the called terminal is already online by sending a request message, thereby enabling the calling terminal and the called terminal to perform the WIFI talkback.

17. The device of claim 12, wherein the judging unit comprises:
- an ACK judging and receiving unit, configured to: after the called terminal receives the request, monitor whether an acknowledgment (ACK) message sent by a Dynamic Host Configuration Protocol (DHCP) server is received or not;
- a processing unit, configured to: when the ACK message sent by the DHCP server is received, determine that the calling terminal successfully obtains the dynamic IP address; and when the ACK message sent by the DHCP server is not received, determine that the calling terminal fails to obtain the dynamic IP address.

18. The device of claim 17, wherein the WIFI talkback module is configured to: when the called terminal determines that the calling terminal has enabled the talkback function, notify, by the called terminal, the calling terminal that the called terminal is already online by sending a request message, thereby enabling the calling terminal and the called terminal to perform the WIFI talkback.

19. The device of claim 12, wherein the judging unit further comprises:
- a host name judging unit, configured to: when the called terminal determines that the calling terminal has successfully obtained the dynamic IP address, judge whether the calling terminal has enabled the talkback function or not through a host name in the received request initiated by the calling terminal for obtaining the dynamic IP address;
- a processing unit, configured to: when the host name is a default host name in a DHCP server, determine that the calling terminal has not enabled the talkback function; and when the host name is a modified host name in the DHCP server, determine that the calling terminal has already enabled the talkback function.

20. The device of claim 12, wherein the WIFI talkback module is configured to: when the called terminal determines that the calling terminal has enabled the talkback function, notify, by the called terminal, the calling terminal that the called terminal is already online by sending a request message, thereby enabling the calling terminal and the called terminal to perform the WIFI talkback.

* * * * *